(12) United States Patent
Antoon et al.

(10) Patent No.: US 10,688,863 B2
(45) Date of Patent: Jun. 23, 2020

(54) PORTABLE AND REMOVABLE AIR-COOLING ACCESSORY FOR ENGINE COOLING IN A PISTON ENGINE AIRCRAFT AND METHOD OF USE THEREOF

(71) Applicants: Ryan Antoon, Venice, CA (US); Farhad Sigari, Marina Del Rey, CA (US)

(72) Inventors: Ryan Antoon, Venice, CA (US); Farhad Sigari, Marina Del Rey, CA (US)

( * ) Notice: Subject to any disclaimer, the term of this patent is extended or adjusted under 35 U.S.C. 154(b) by 48 days.

(21) Appl. No.: 16/137,031

(22) Filed: Sep. 20, 2018

(65) Prior Publication Data
US 2020/0094670 A1   Mar. 26, 2020

(51) Int. Cl.
| | | |
|---|---|---|
| *B60K 13/04* | (2006.01) | |
| *B60K 13/06* | (2006.01) | |
| *F24F 7/02* | (2006.01) | |
| *F24F 5/00* | (2006.01) | |
| *F24F 7/013* | (2006.01) | |

(52) U.S. Cl.
CPC .............. *B60K 13/04* (2013.01); *B60K 13/06* (2013.01); *F24F 5/0003* (2013.01); *F24F 7/013* (2013.01); *F24F 7/025* (2013.01); *F24F 2221/12* (2013.01)

(58) Field of Classification Search
CPC .......... B60K 11/00; B60K 11/06; B60K 11/08
See application file for complete search history.

(56) References Cited

U.S. PATENT DOCUMENTS

| | | | |
|---|---|---|---|
| 6,695,047 B2* | 2/2004 | Brocksopp | F01P 3/18 123/41.04 |
| 2010/0071870 A1* | 3/2010 | Kisse | F01P 1/02 165/51 |
| 2011/0139525 A1* | 6/2011 | Karl | B60K 11/02 180/68.1 |

* cited by examiner

*Primary Examiner* — Kevin A Lathers

(57) ABSTRACT

A portable removable air-cooling accessory device for an air cooled engine, in a piston and/or light aircraft, and a method of using the air-cooling accessory to cool the engine of the light aircraft are described. The portable removable air-cooling accessory device includes at least a fan assembly, a housing having an enclosure forming and airflow channel, a rechargeable battery, and electrical components for controlling and monitoring the portable removable air-cooling accessory device is placed on the opening of the oil access door or the engines air cooling inlets to provide cooling airflow over the engine when a hot start scenario is anticipated.

19 Claims, 17 Drawing Sheets

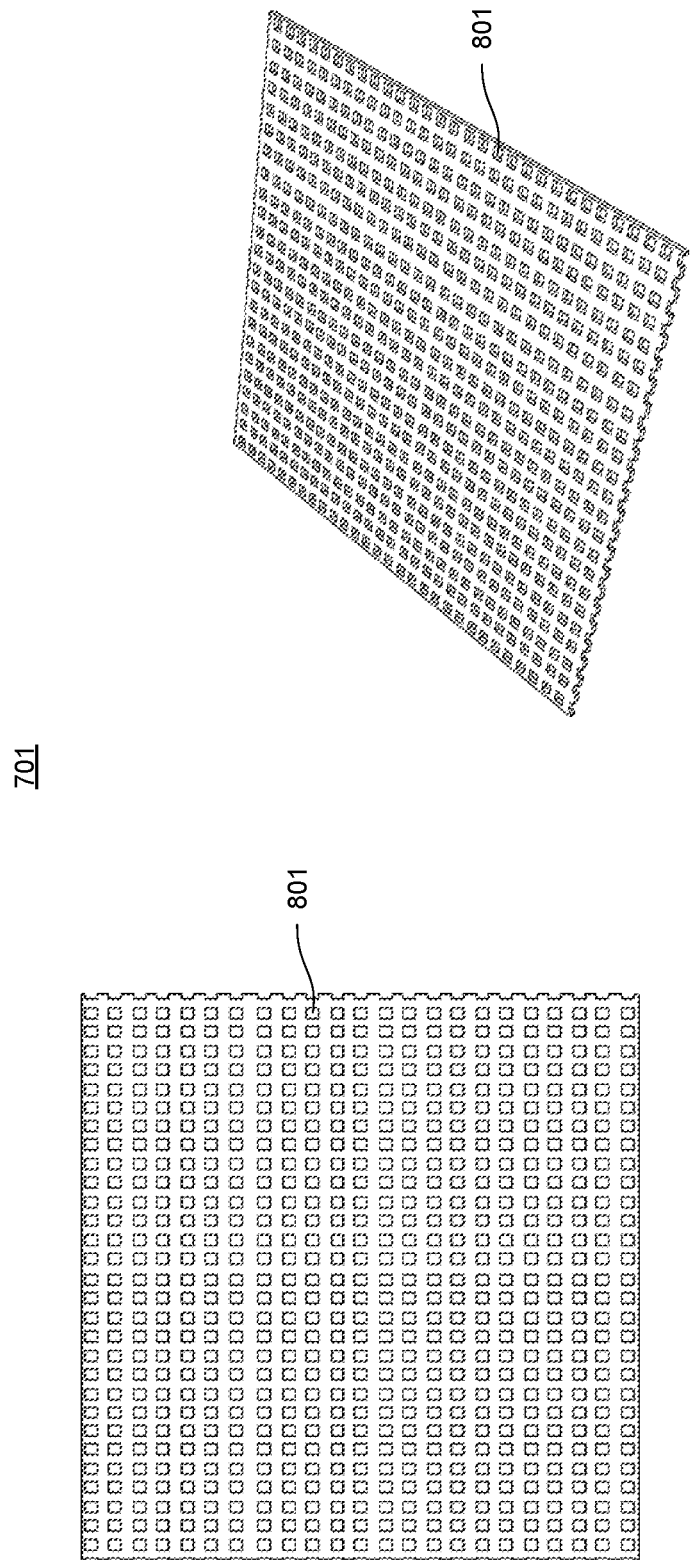

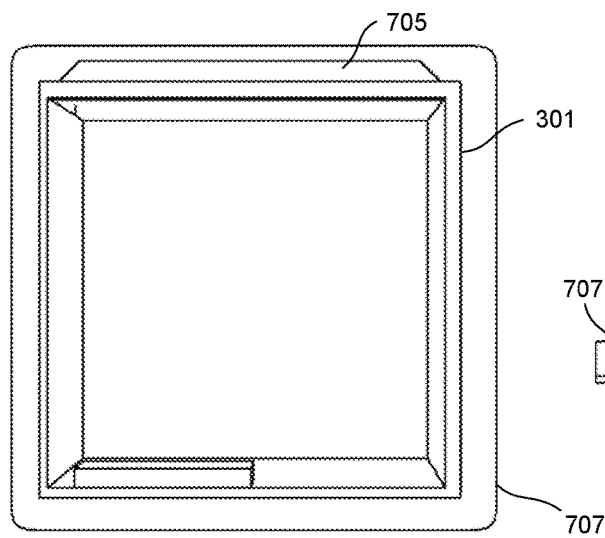
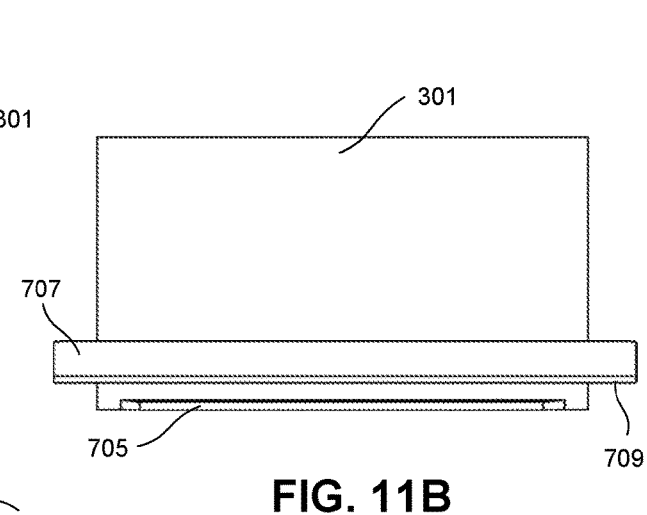
FIG. 11A
FIG. 11B
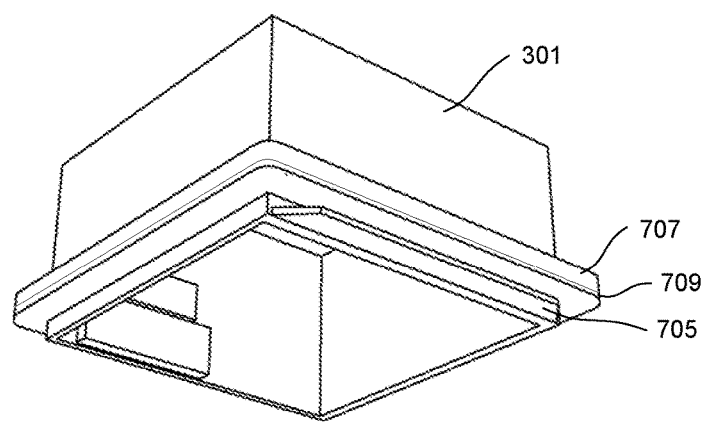
FIG. 11C

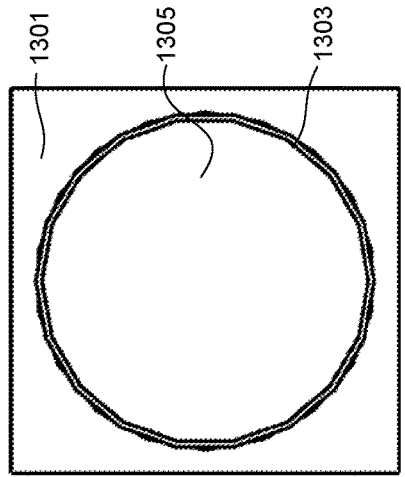
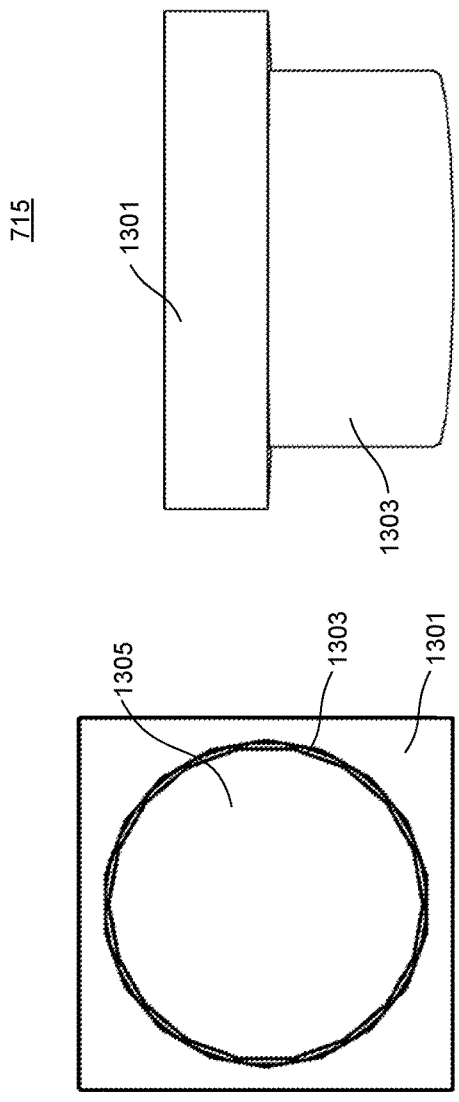
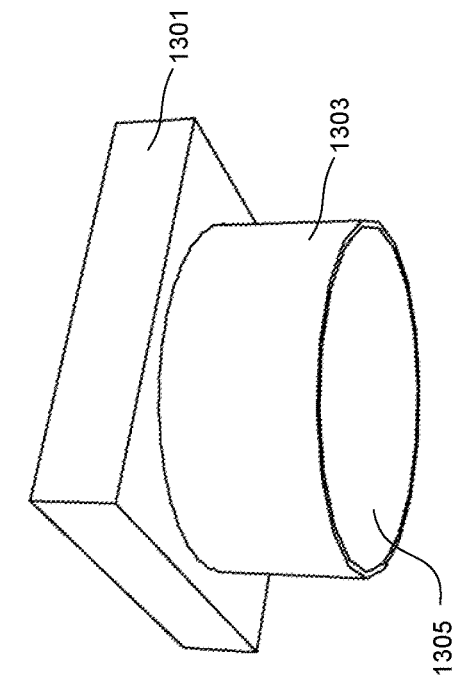
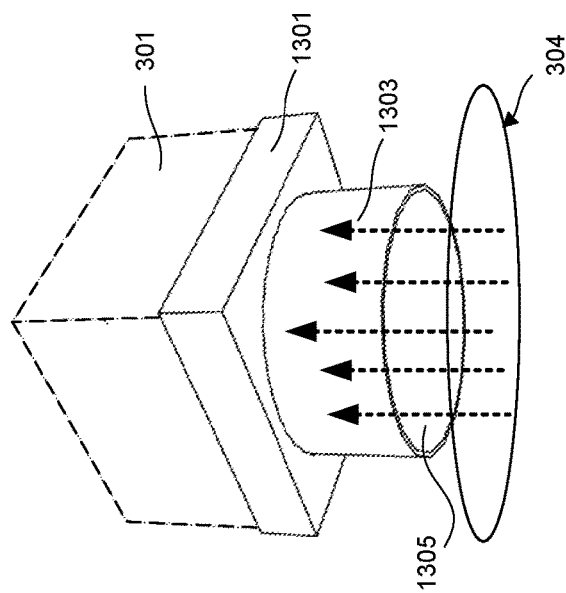

PORTABLE AND REMOVABLE AIR-COOLING ACCESSORY FOR ENGINE COOLING IN A PISTON ENGINE AIRCRAFT AND METHOD OF USE THEREOF

FIELD OF THE INVENTION

The present invention relates to a portable removable air-cooling accessory device for air cooling an engine in a piston engine aircraft and a method of using the air-cooling accessory to cool the engine of the piston engine aircraft. Specifically, the removable air-cooling accessory device is placed on the opening of the oil access door or the air cooling inlet of the cowling of the piston engine aircraft to provide cooled airflow to the engine when a hot start scenario is anticipated.

BACKGROUND

In motors and engines, heating problems may occur causing vapor lock in the fuel lines. Vapor lock may cause the engine to fail and stop running when the fuel in the system overheats. Such failures most likely occur on hot days or when the engine is at constant acceleration and deceleration, making the engine work harder and get hotter. The excess heat may cause the fuel to vaporize, preventing the fuel to be supplied to the engine resulting in engine ignition problems.

In some piston engine aircraft, pilots have experienced similar issues with vapor lock in piston engine which is an inherent and common problem with this type of engine design. Such issues generally are reported to include engine performance problems and hot start problems with significant trouble starting the engine while hot, causing unexpected delays and frustration for pilots.

SUMMARY

It is an advantage of the present invention to provide a portable and removable air-cooling accessory device for conveying an ambient airflow to cool an engine of a piston engine aircraft through an engine air cooling inlet, the portable and removable air-cooling accessory device including a housing for receiving and channeling the ambient airflow; a motorized fan assembly coupled to a top portion of the housing, the housing includes a hollow enclosure and two ports, the two ports include an air exhaust port formed at the top portion of the housing and an airflow port opening formed at a bottom portion of the housing, the motorized fan assembly when enabled is configured to force air flow through the cowling and up through the engine oil door resulting in a "chimney cooling effect; a power switch coupled to the motorized fan assembly and the housing; and a rechargeable battery coupled to the motorized fan assembly, the power switch and the housing, the rechargeable battery provides power to drive the motorized fan assembly when activated by the power switch.

It is another advantage of the present invention to provide a method for air cooling an engine in a piston engine aircraft using a portable and removable air-cooling accessory device, the method including determining if a hot start scenario on the piston engine aircraft is anticipated; selecting, upon determination of the hot start scenario, a port location on the piston engine aircraft into which the portable and removable air-cooling accessory device is inserted, the port location is an oil door access port or an engine cooling air inlet; temporarily attaching the portable and removable air-cooling accessory device into the oil door access port or the cowl flap access port; cooling the engine of the piston engine aircraft below a predetermined temperature; and removing the portable and removable air-cooling accessory device after cooling the engine below the predetermined temperature or before takeoff and flight.

In one embodiment, the engine input port includes an oil compartment access or a cowl flap. In another embodiment, the portable and removable air-cooling accessory device also includes an optional LED indicator attached to the housing. In yet another embodiment, the portable and removable air-cooling accessory device also includes a USB power port coupled to the rechargeable battery for delivering an external power to charge the rechargeable battery. It still yet another embodiment, the portable and removable air-cooling accessory device may include a USB power port coupled to the rechargeable battery for delivering an external power to charge the rechargeable battery.

In one aspect, the housing and motorized fan assembly are fabricated from heat resistant material to withstand extreme heat that is evacuated from the engine input port of the piston engine aircraft.

In another aspect, the portable and removable air-cooling accessory device may include a printed circuit board including a microcontroller for controlling the motorized fan assembly and an onboard temperature sensor for monitoring and reading a temperature reading of the ambient airflow and converting the temperature reading into an electrical signal for the microcontroller to process and generate an appropriate response to control the motorized fan assembly.

In yet another aspect, the printed circuit board includes a wireless chipset for allowing another wireless-enabled device to wirelessly control the portable and removable air-cooling accessory device.

In another embodiment, the portable and removable air-cooling accessory device may include a support and mounting bracket coupled to an exterior of the housing.

In yet another embodiment, the portable and removable air-cooling accessory device may include a support and mounting bracket coupled to an exterior of the housing.

In one aspect and advantage, the portable and removable air-cooling accessory device may include a flange coupled near the bottom portion of the housing, the flange is configured to provide a support area for the housing to sit on the engine input port of the piston engine aircraft.

In another aspect and advantage, the portable and removable air-cooling accessory device may include an airflow port adapter for coupling a bottom portion of the housing to fit a variety of different shapes of engine input ports.

In another embodiment, the portable and removable air-cooling accessory is disconnected and removed from the piston engine aircraft when in flight or not in use.

In yet another embodiment, one or more temporary fasteners are coupled to the housing to temporarily secure the housing to the piston engine aircraft, the one or more temporary fasteners may include quick release latches, quick release pins, threaded screws, snap on buttons, clips, straps, or hook and loop fasteners.

In a further embodiment, the portable and removable air-cooling accessory may be integrated into the center of a compressible cowl plug.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 8A-FIG. 8B illustrate multiple views of the filter screen of the air-cooling accessory device, in accordance to an embodiment.

FIG. 11A-FIG. 11C illustrate a top view (FIG. 11A), a side view (FIG. 11B), and a side perspective view (FIG. 11C) of the mounting bracket, the flange and the housing, in accordance to an embodiment.

FIG. 13A-FIG. 13E illustrate a top view (FIG. 13A), a side view (FIG. 13B), a bottom view (FIG. 13C), and side perspective views (FIG. 13D and FIG. 13E) of the airflow port adapter, in accordance to an embodiment.

In the appended figures, one or more elements may have the same reference numeral in different figures indicating previously described elements.

DETAILED DESCRIPTION

A novel and effective device and method for addressing and preventing vapor lock and hot start problems in the engines of piston engine aircrafts is to provide a removable (non-fixed) air-cooling accessory device that is placed on the engine's cowl covering or the opening of the oil access door. As referred to throughout this document, piston engine aircrafts may generally refer to a commercial or private aircraft, including, for example, Cessna, Piper, Beechcraft, Cirrus and similar piston engine aircraft. In practice, the removable air-cooling accessory device may be used in conditions in which the hot start scenario is anticipated (i.e., when starting the aircraft following a short duration engine stoppage) and is removed before flight and not used during flight. In operation, the removable air-cooling accessory device may facilitate the rapid movement of ambient airflow through the engine's compartment, assisting in air cooling the engine to the point that the fuel in the lines is no longer in a vapor state.

The two inlets at the front of the engine compartment behind the propeller are the engine air cooling inlets. This is where ram air (resulting entirely from the movement of the aircraft through the ambient air) enters the engine compartment while in flight to cool the engine (referred to as air cooled piston engines). In operation, the removable air-cooling accessory device may facilitate the rapid movement of ambient airflow through the engine's compartment by causing a continuation of that airflow when the aircraft is shut down and not moving, resulting in a more rapid continuation of engine cooling. The opening of the oil door results in what is known as a "chimney cooling effect." This causes air movement up through the opening, and therefor pulls air over the engine. Alone, this can greatly decrease cooling times. The combination in some configuration of forcing air either into the engine cooling air inlets or sucking it up through the oil door itself, and allowing it to escape via the oil access door (on top of the engine cowling) results in a greatly increased rate of cooling of the engine in a "parked" configuration.

Figure 1A:
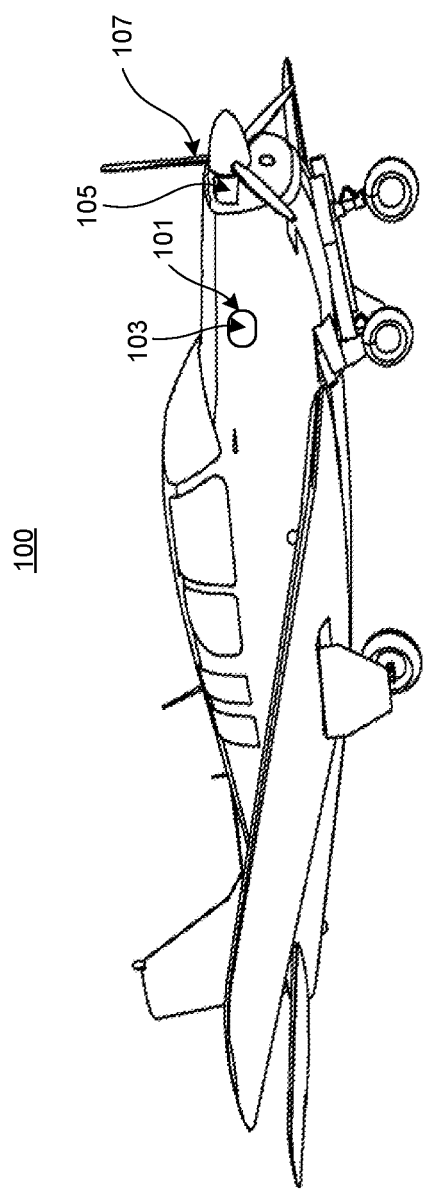
FIG. 1A and FIG. 1B illustrate a closed door (FIG. 1A) configuration and an open door (FIG. 1B) configuration, respectively, of an engine/oil compartment access located on a side portion of a piston engine aircraft having liquid fuel fed engine and a propeller.
Figure 1B:
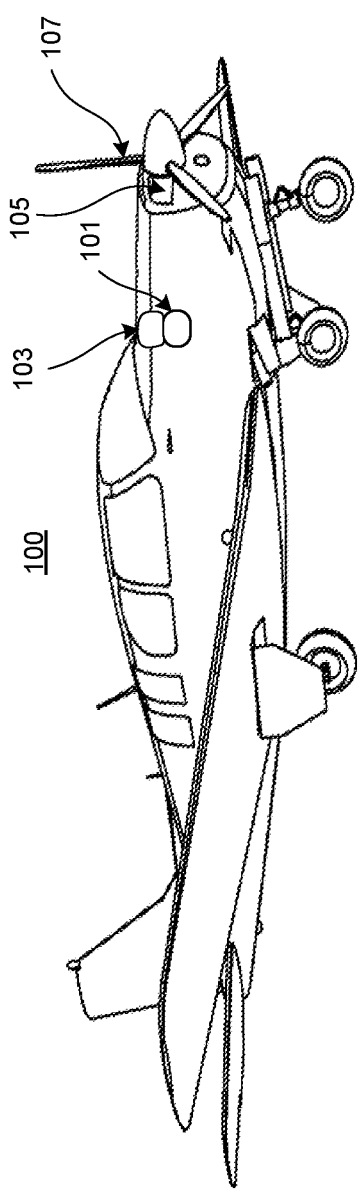

FIG. 1A and FIG. 1B illustrate a closed door (FIG. 1A) configuration and an open door (FIG. 1B) configuration, respectively, of an engine/oil compartment access 101 located on a side portion of a piston engine aircraft 100 having liquid fuel fed piston engine (not shown) and a propeller 107. In FIGS. 1A and 1B, the engine/oil compartment access 101 includes an oil door 103 that allows partial access to the engine compartment of the piston engine aircraft 100. In the open position, as shown in FIG. 1B, the oil door 103 may include a hinge (not shown) that swings in an upward position providing an opening to access a portion of the engine/oil compartment access 101. The piston engine aircraft 100 may also include engine cooling air inlets 105 located near the propeller 107 which provides a means for engine cooling. Piston aircraft may include engine air cooling inlets 105 that provide a primary source of cooling of an air cooled engine in flight. While uncovered in flight, the engine air cooling inlets 105 compress and guide air into the engine compartment to cool the aircraft engine. During storage, cowl plugs are commonly inserted into these engine air cooling inlets 105 to prevent foreign objects from entering the engine compartment (debris, animals, etc.).

Figure 2A:
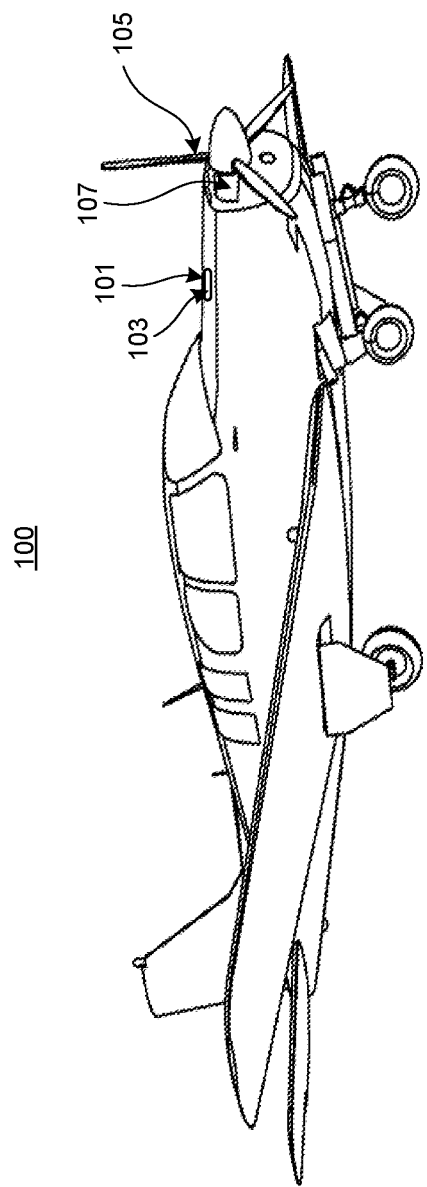
FIG. 2A and FIG. 2B illustrate other piston engine aircrafts configurations having the engine/oil compartment access situated on a topside portion above the engine.
Figure 2B:
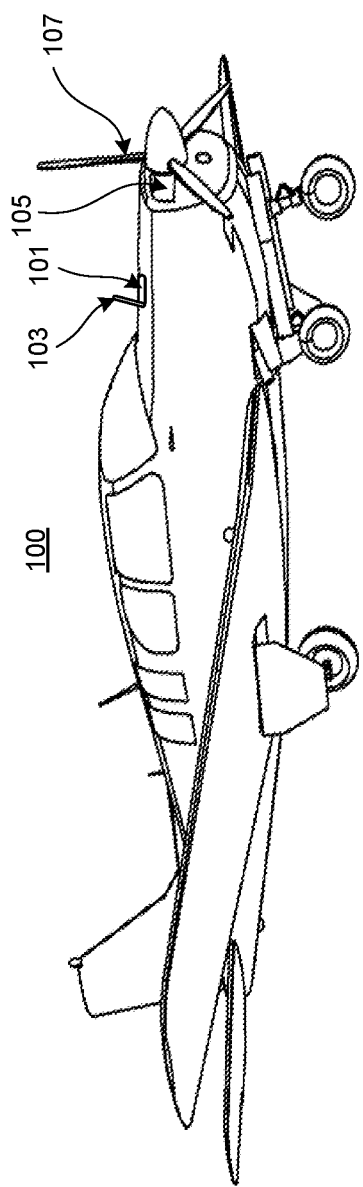

In another configuration, some piston engine aircrafts may have the engine cowling/oil compartment access 101 situated on a topside portion above the engine as shown in FIG. 2A and FIG. 2B. Regardless of the various engine designs and aircraft model types, the engine/oil compartment access 101 and/or engine cooling air inlets 105 are generally available on most models and types of piston engine aircrafts.

Figure 3:
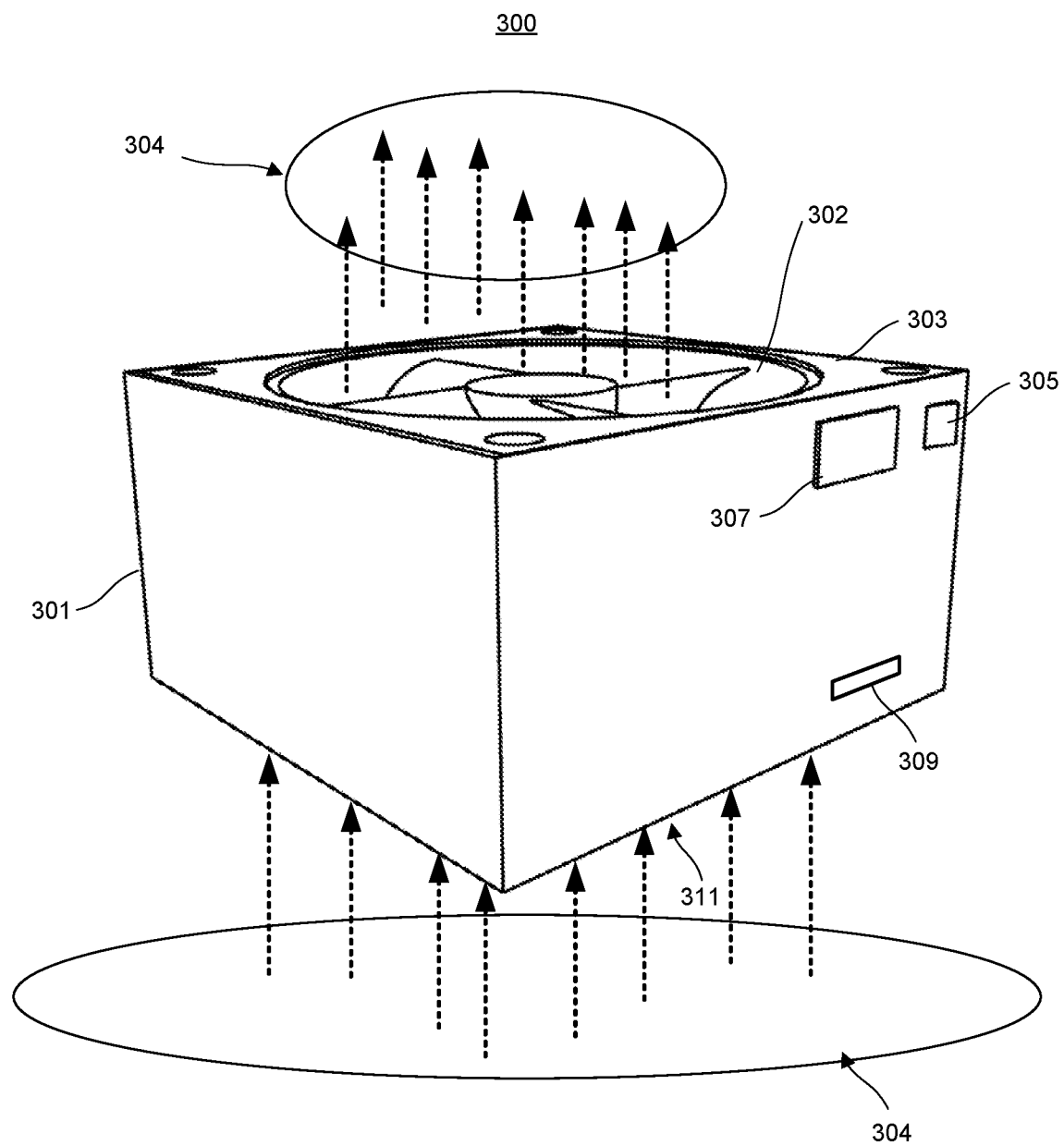
FIG. 3 illustrates a perspective view of a novel portable and removable (non-fixed) air-cooling accessory device used in light-aircraft applications, in accordance to an embodiment.

FIG. 3 illustrates a perspective view of a novel portable and removable (non-fixed) air-cooling accessory device 300 used in light-aircraft applications in accordance to an embodiment. External components of the portable and removable air-cooling accessory device 300 includes a housing 301 having a hollow enclosure (cavity) for transmitting and channeling an ambient airflow 304 and two openings (an air exhaust opening 302 and an airflow port opening 311) formed at the top and bottom of the housing 301, respectively; a motorized fan assembly 303 connected to a top portion of the housing 301 at the air exhaust opening 302; a power switch 305 coupled to the housing 301; an optional LED indicator or display 307 attached to the housing 301; and a USB power port 309 connected to the housing 301 for delivering power via a USB cable (not shown) and charging a rechargeable battery (not shown), including for example nickel-cadmium battery (NiCd), nickel-metal hydride battery (NiMH), lithium-ion battery, Lithium-ion polymer batteries (LiPo), and the like.

Operationally, the motorized fan assembly 303 is configured to pull up air up through the oil access door 103 and over the engine, the motorized fan assembly 303 creating a high velocity airflow in through the engine cooling air inlets 105 and up through the engine oil access door 103 resulting in a rapid chimney cooling effect of the engine itself.

Figure 4A:
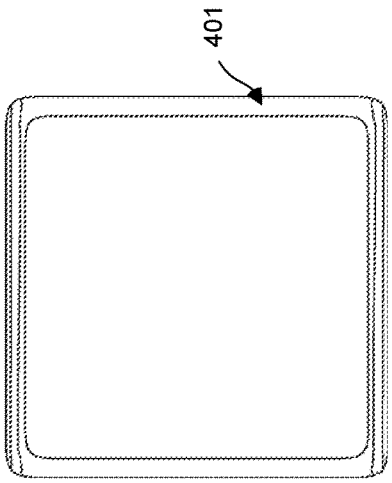
FIG. 4A-FIG. 4F illustrate top and perspective views of different shapes and configurations of the housing forming an airflow channel that may be used in the air-cooling accessory device, in accordance to an embodiment.
Figure 4B:
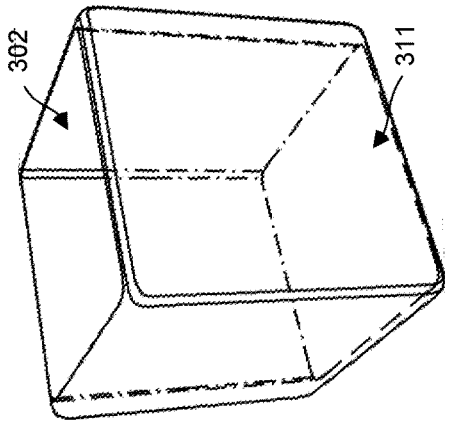
Figure 4C:
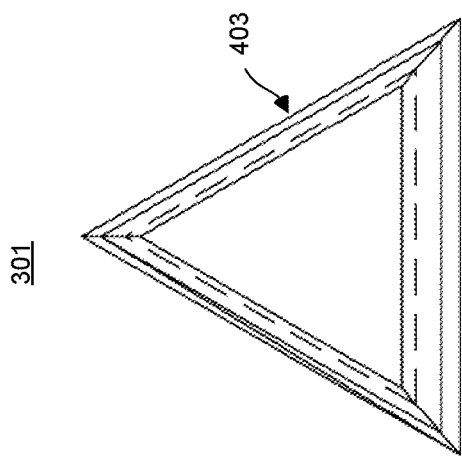
Figure 4D:
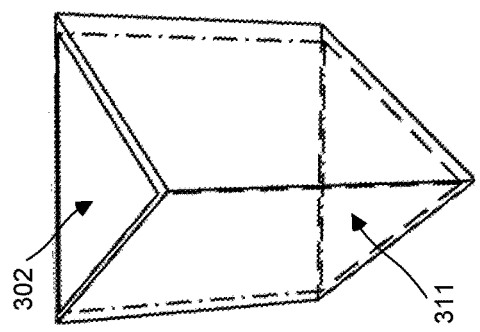
Figure 4E:
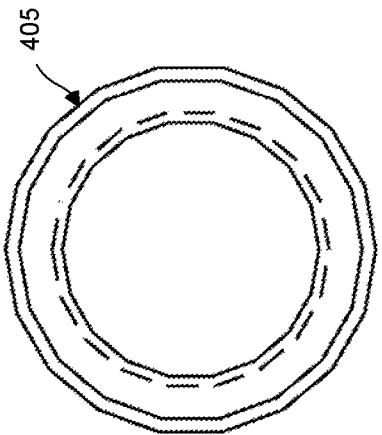
Figure 4F:
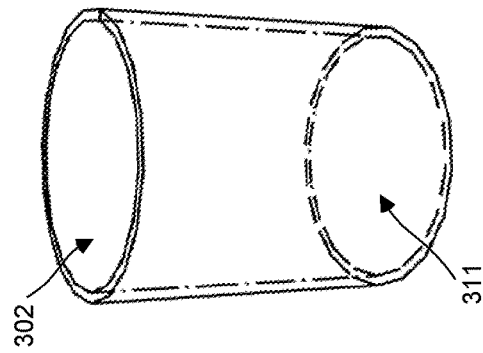

FIG. 4A-FIG. 4F illustrate top and perspective views of different shapes and configurations of the housing 301 forming an airflow channel that may be used in the air-cooling accessory device 300. In FIG. 4A, for example, the housing 301 as viewed from the top may include multiple planar surfaces which form a 4-sided hollow enclosure in the shape of a rectangular box 401 having two openings. The air exhaust opening 302 and the airflow port opening 311 of the rectangular box 401 are shown in a perspective view as provided in FIG. 4B. In another implementation shown in FIG. 4C, the housing 301 as viewed from the top may include multiple planar surfaces which form a 3-sided hollow enclosure in the shape of a triangular prism 403 having two openings. The air exhaust opening 302 and the airflow port opening 311 of the triangular prism 403 are shown in a perspective view as provided in FIG. 4D. In yet another implementation shown in FIG. 4E, the housing 301 as viewed from the top may include a smooth continuous surface forming hollow tube enclosure 405 having two openings. The air exhaust opening 302 and the airflow port opening 311 of the hollow tube enclosure 405 are shown in a perspective view as provided in FIG. 4F. The various shapes and configurations of the housing 301 presented hereinabove are only a few simple examples that may form the housing 301 and may include other designs such as narrow rectangular tubes, spiral tube designs, and other complex designs that provide necessary airflow dynamics to efficiently deliver cooling to the engine of the piston engine aircraft 100.

Figure 5B:
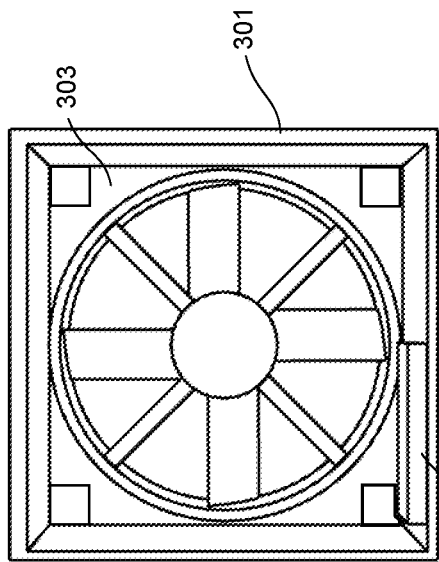
FIG. 5A-FIG. 5D illustrate multiple views of the portable and removable air-cooling accessory device including a top view (FIG. 5A), a bottom view (FIG. 5B), a front panel view (FIG. 5C), and back side view (FIG. 5D), in accordance to an embodiment.
Figure 5D:
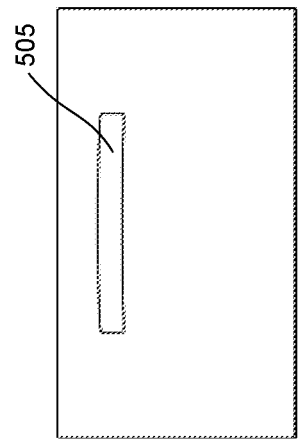
Figure 5A:
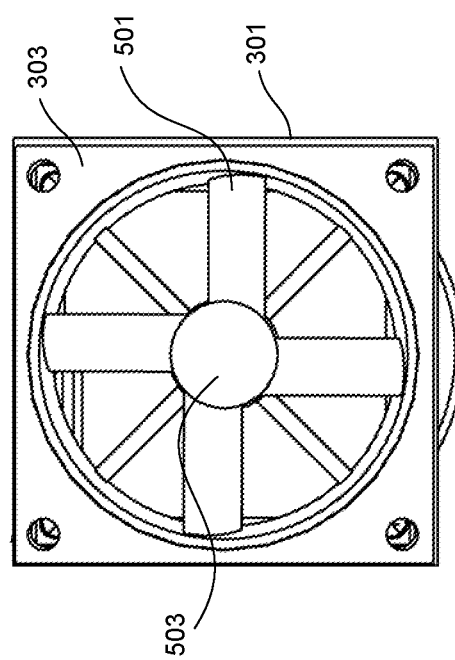
Figure 5C:
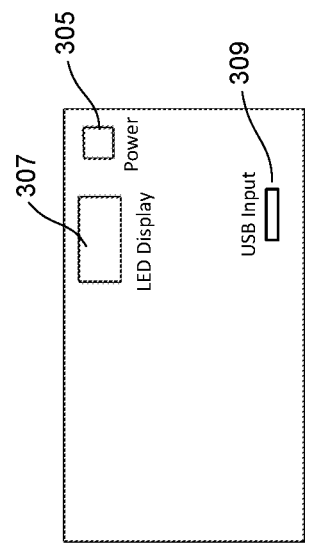

FIG. 5A-FIG. 5D illustrate multiple views of the portable and removable air-cooling accessory device 300 including a top view (FIG. 5A), a bottom view (FIG. 5B), a front panel view (FIG. 5C), and back side view (FIG. 5D). As shown in FIG. 5A, the motorized fan assembly 303 may include multiple fan blades 501, an electric heavy duty DC motor 503 and may be attached to the interior of the housing 301, via welds, screws, adhesive materials, or other fasteners. An optional handle 505, which is also shown FIG. 5D, may be attached to the back side panel of the housing 301, making the accessory device 300 easy to carry or transport when not in use. A power source including a rechargeable battery 507 may be mounted to the interior wall of the housing 301 as shown in FIG. 5B, providing power to drive the fan assembly 303 and other electrical components via interconnecting wires (not shown). In FIG. 5C, the front panel may include multiple electronic components to control, operate, and monitor the status of the accessory device 300 during operation, including the power switch 305, the optional LED indicator or display 307, and the USB power port 309.

In one configuration, the fan assembly 303 may include a high powered miniature fan that is designed to achieve a maximum airflow through the accessory device 300. To drive the high powered fan, the rechargeable battery 407 may include a minimum voltage and amp hour requirement to support and sustain power to the high powered fan for at least one hour. In another embodiment, materials used to form the housing 301 may include a heat resistant material such as, for example, carbide materials, advanced ceramics, high-melting point metals and the like, that is able to withstand extreme heat that is evacuated from the engine compartment. In yet another embodiment, the housing 301 of the air-cooling accessory device 300 may be coated with a highly visible color (e.g., red, fluorescent orange, fluorescent yellow, or the like) to prevent inadvertent use during engine on certain flight procedures. Typical dimensions of the air-cooling accessory device 300 may be approximately 6"-16" in width, 6"-16" in length, and 6"-16" in depth. However, the final dimensions of the air-cooling accessory device 300 are generally configured to closely match the size of the engine/oil compartment access 101 or the engine cooling air inlets 105 of the piston engine aircraft 100.

Figure 6:
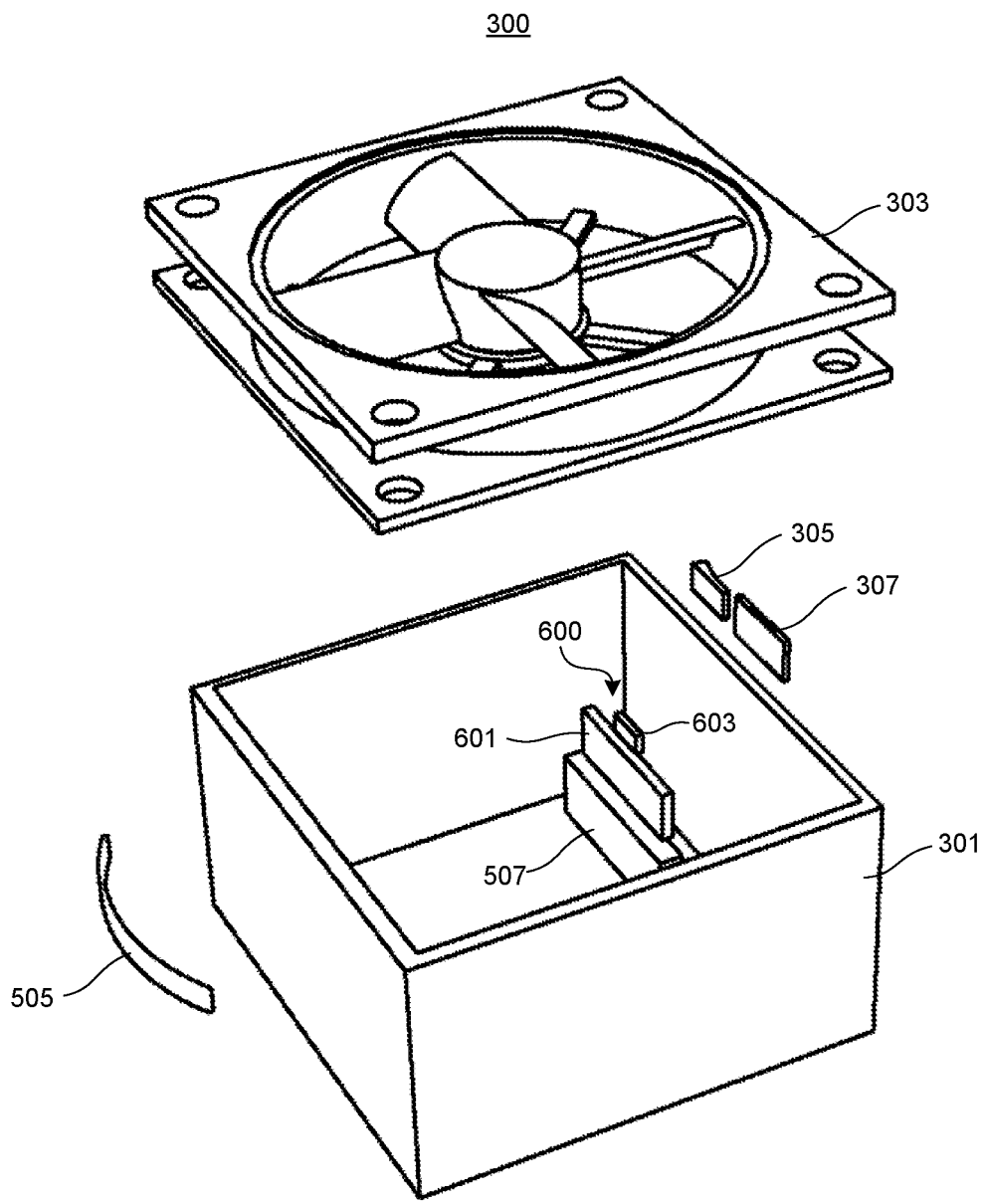
FIG. 6 illustrates an exploded view of the air-cooling accessory device, in accordance to an embodiment.

FIG. 6 illustrates an exploded view of the air-cooling accessory device 300. In this exploded view, a printed circuit board (PCB) 600 including several electrical components is shown coupled to the interior of the housing 301. These electrical components may include a microcontroller 601 for controlling the fan and an optional onboard temperature sensor 603 for detecting and reading the temperature of the airflow 304 and converting the reading into an electrical signal for the microcontroller to process and generate an appropriate response. In one application, for example, the optional temperature sensor 603 may be coupled to the fan 303 to shutoff power when a desired temperature set point is achieved. This option would extend battery life and would allow the fan accessory to operate as needed. In another implementation, the microcontroller 601 may be configured through firmware or software to control a directional mode selection of the fan 303, the directional mode selection may be set to clockwise (CW), counter-clockwise (CCW), asynchronous pulsating mode, or other modes depending on need and airflow requirements (i.e., forward, reverse or pulsating airflow). In yet another implementation, the microcontroller 601 may be configured through firmware or software to control the fan speed setting at various levels (e.g., low, medium, high, turbo).

Figure 7:
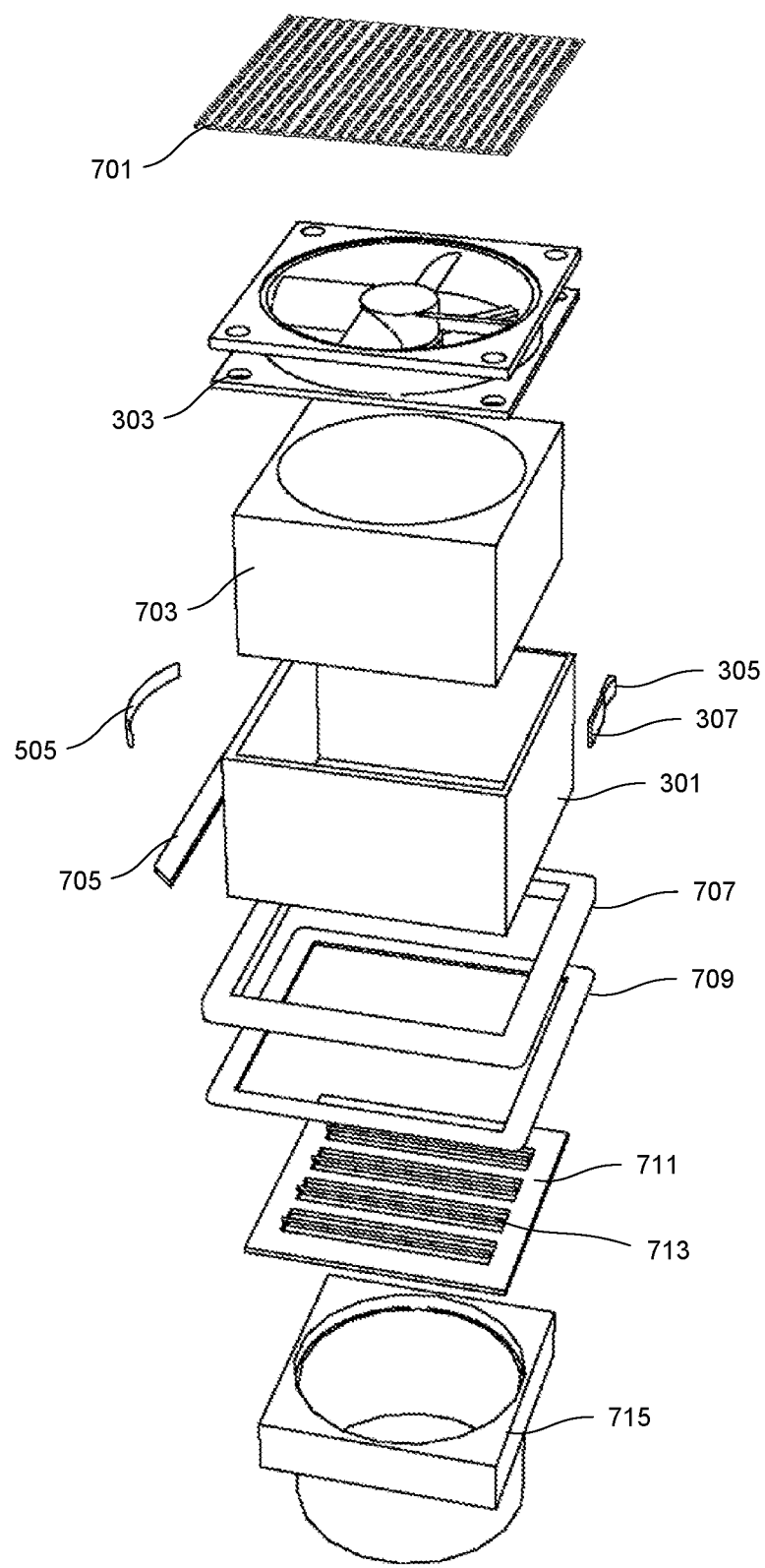
FIG. 7 illustrates an exploded view of the air-cooling accessory device having additional elements to enhance the performance of the accessory device, in accordance to an embodiment.
Figure 9D:
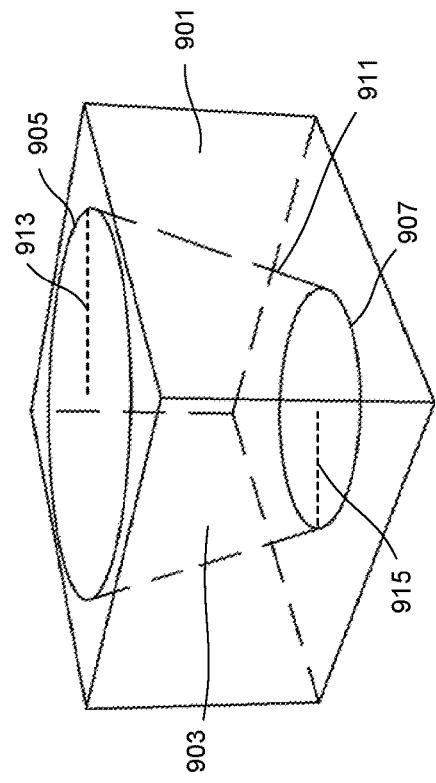
FIG. 9A-FIG. 9D illustrate a top view (FIG. 9A), a bottom view (FIG. 9B), a side perspective view (FIG. 9C), and a perspective side view with hidden lines shown (FIG. 9D) of the airflow handler, in accordance to an embodiment.
Figure 9B:
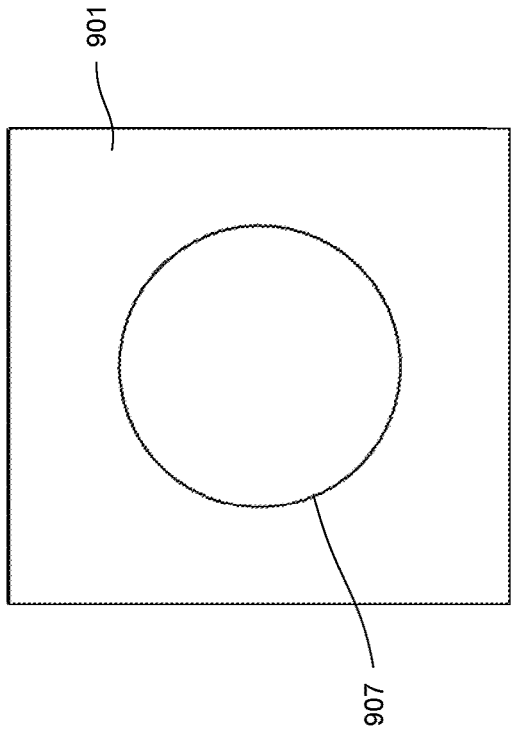
Figure 9A:
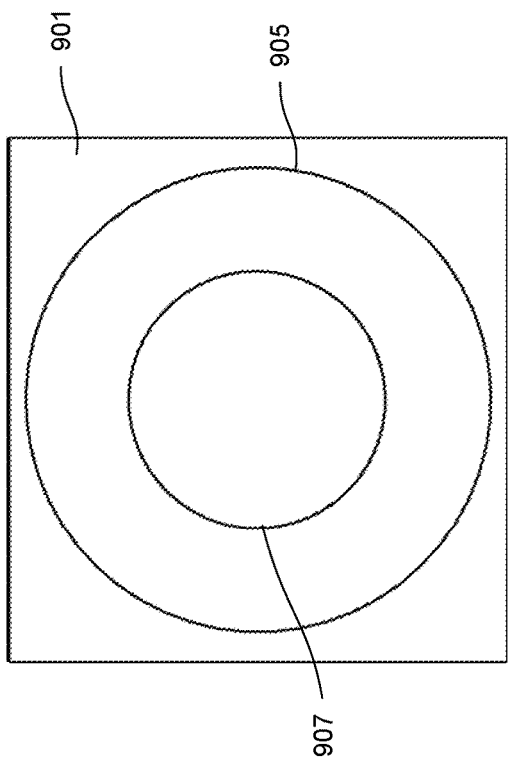
Figure 9C:
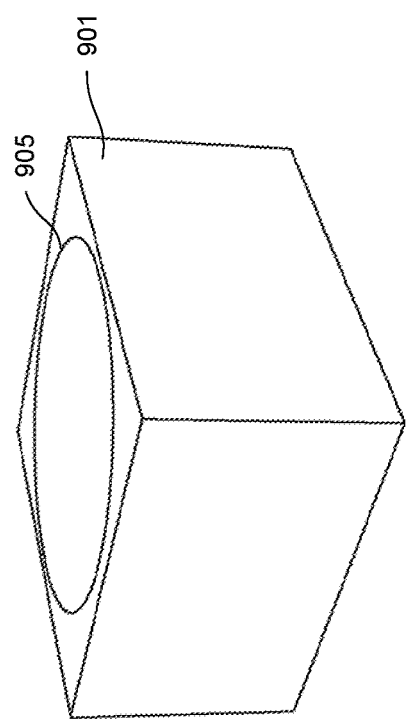
Figure 10B:
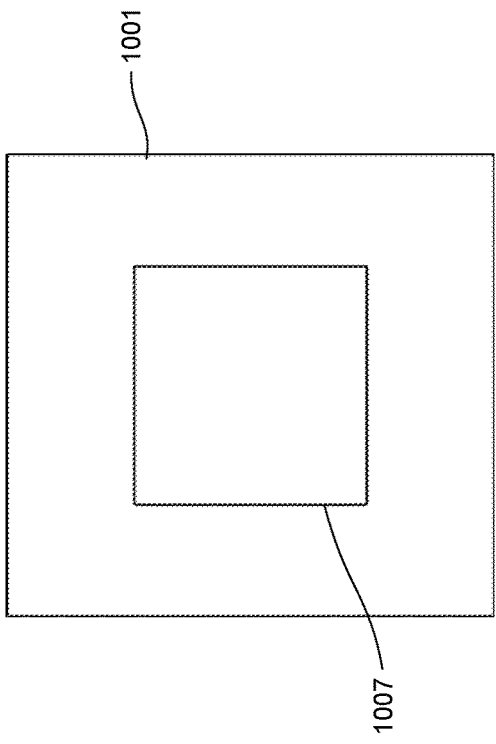
FIG. 10A-FIG. 10D illustrate a top view (FIG. 10A), a bottom view (FIG. 10B), a side perspective view (FIG. 10C), and a perspective side view with hidden lines shown (FIG. 10D) of another configuration of the airflow handler, in accordance to an embodiment.
Figure 10D:
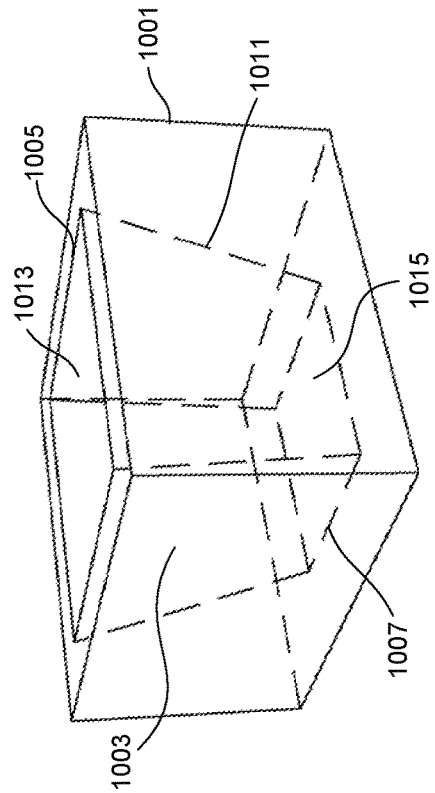
Figure 10A:
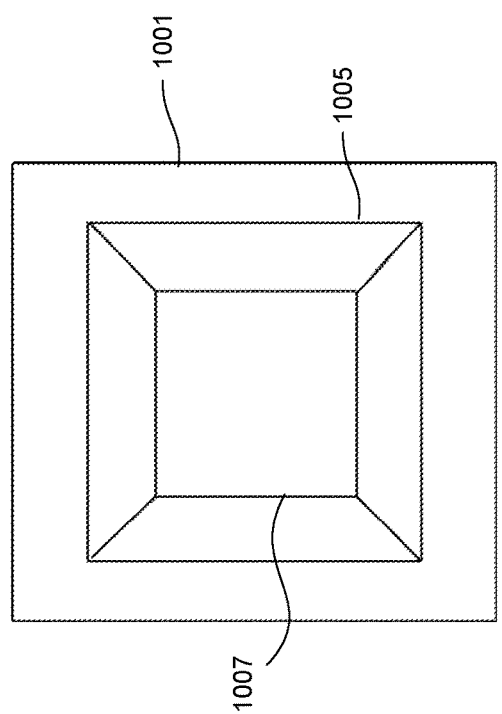
Figure 10C:
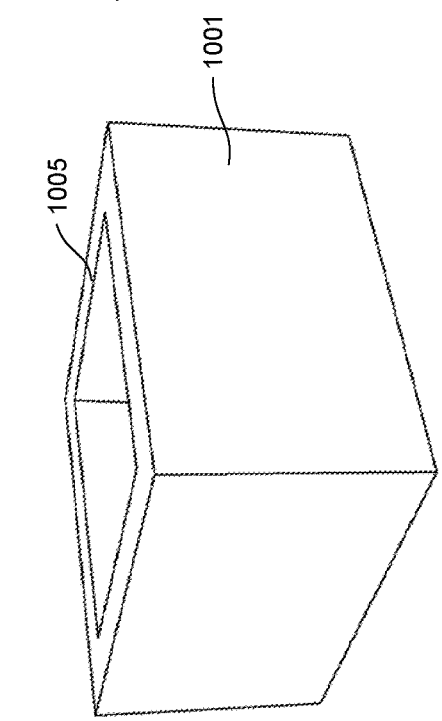
Figure 12B:
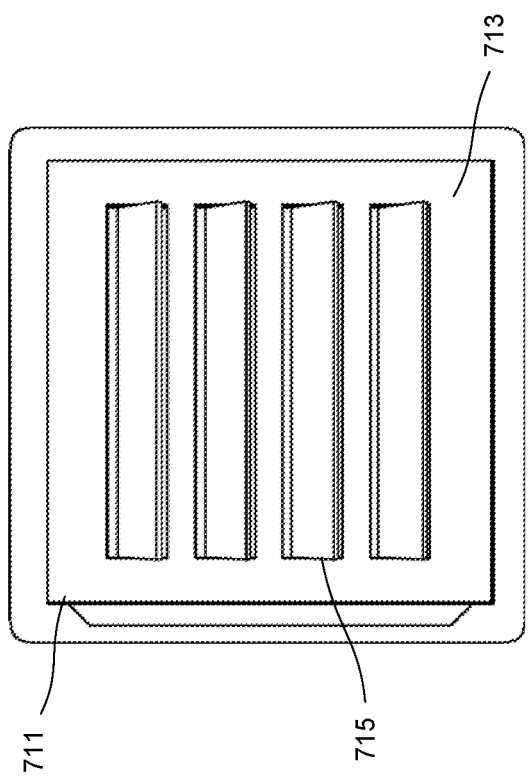
FIG. 12A-FIG. 12D illustrate a top view (FIG. 12A), a bottom view (FIG. 12B), a side view (FIG. 12C), and a side perspective view (FIG. 12D) of the grille and the housing 301, in accordance to an embodiment.
Figure 12D:
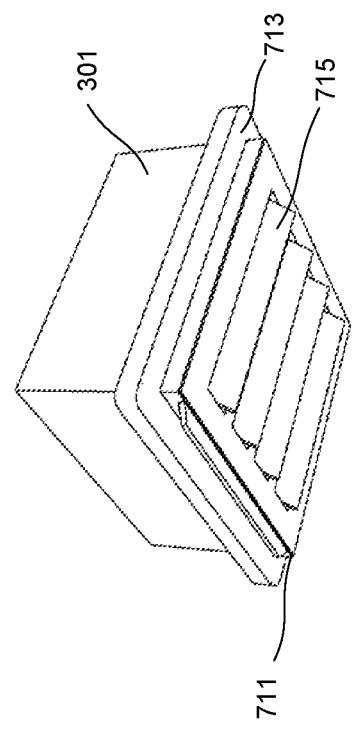
Figure 12A:
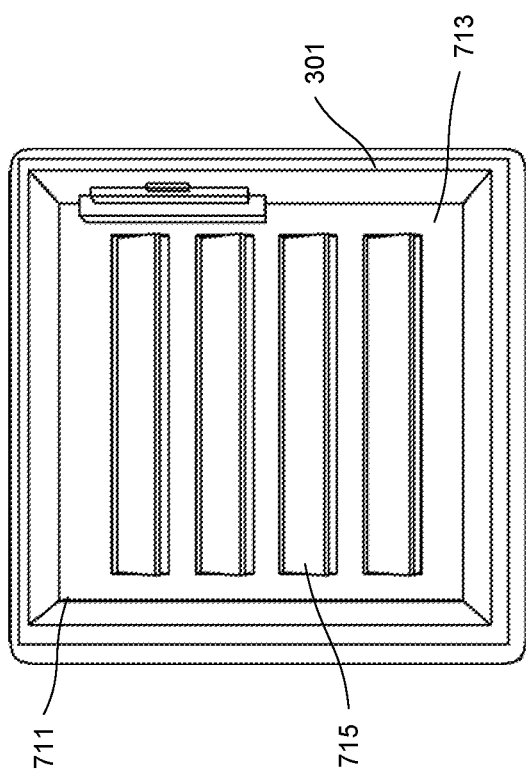
Figure 12C:
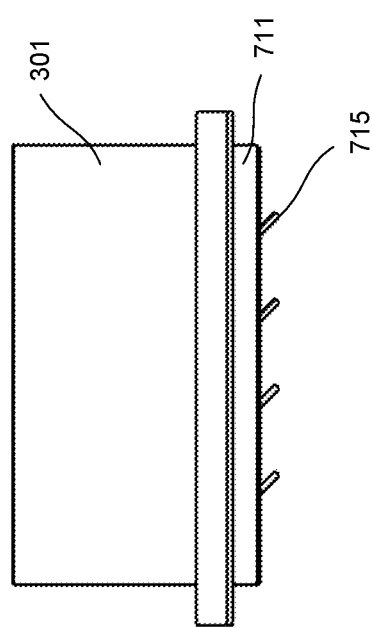

FIG. 7 illustrates an exploded view of the air-cooling accessory device 300 having additional elements to enhance the performance of the accessory device 300 in accordance to an embodiment. In this exploded view, the accessory device 300 may include a filter screen 701 coupled to the fan assembly 303, an airflow handler 703 coupled to the interior of the housing 301, a support and mounting bracket 705 coupled to the exterior of the housing 301, a flange 707 coupled near the bottom of the housing 301, the flange 707 configured to provide a support area for the housing 301 to mount on the body of the piston engine aircraft 101, a gasket 709 coupled to the flange 707 for providing an air tight sealing between the housing 301 and the body of the piston engine aircraft 101, a grille 711 coupled to the housing 301, the grille may include adjustable louvers 713 to redirect the airflow 304, and an airflow port adapter 715 for coupling the housing 301 to fit a variety of different shapes of oil door or cowl flap compartments.

FIG. 8A-FIG. 8B illustrate multiple views of the filter screen 701 of the air-cooling accessory device 300. In one implementation, the filter screen 701 may include a fine mesh screen having micro holes 801 to allow ambient airflow 304 through the air exhaust opening 302 while preventing large particles to enter the fan assembly 303. In practice, the fine mesh screen of the filter screen 701 is constructed from an industrial grade metal material capable of withstanding high temperatures. The filter screen 701 may be fastened and secured directly to either the housing 301 or to fan assembly 303 using screws, clips, adhesive materials or the like.

FIG. 9A-FIG. 9D illustrate a top view (FIG. 9A), a bottom view (FIG. 9B), a side perspective view (FIG. 9C), and a perspective side view with hidden lines shown (FIG. 9D) of the airflow handler 703 in accordance to an embodiment. In this example, the airflow handler 703 may include an enclosure 901 having a hollow interior 903 and a top opening 905 and a bottom opening 907. The hollow interior 903 is generally cylindrical and cone-like in shape 911 forming a narrow inlet and having the top opening 905 defined by a first circle having a first radius 913 and the bottom opening 907 defined by a second circle having a second radius 915, the second radius 915 of the bottom opening 907 being smaller than the first radius 913 of the top opening 905. In operation, the airflow 304 produced by the fan 303 may be further channeled through the through the narrow inlet of the airflow handler 703, increasing the airflow rate into the engine compartment.

FIG. 10A-FIG. 10D illustrate a top view (FIG. 10A), a bottom view (FIG. 10B), a side perspective view (FIG. 10C), and a perspective side view with hidden lines shown (FIG. 10D) of another configuration of the airflow handler 703 in accordance to an embodiment. In this embodiment, the airflow handler 703 may include an enclosure 1001 having a hollow interior 1003 and a top opening 1005 and a bottom opening 1007. The hollow interior 1003 has a shape of a tapered box 1011 having the top opening 1005 defined by a first rectangle 1013 and the bottom opening 1007 defined by a second rectangle 1015, the second rectangle 1015 of the bottom opening 1007 being smaller than the first rectangle 1013 of the top opening 1005. In operation, the fan 1003 may force the airflow 1004 to be channeled through the tapered chamber of the hollow interior 1003 thereby increasing the airflow rate through the bottom opening 1007.

FIG. 11A-FIG. 11C illustrate a top view (FIG. 11A), a side view (FIG. 11B), and a side perspective view (FIG. 11C) of the mounting bracket 705, the flange 707 and the housing 301, in accordance to an embodiment. The mounting bracket 705 or flange 707 provides a support member on the housing 301 allowing a place for the attachment to the oil access door 103 or engine air cooling inlets 105 of the piston engine aircraft 100. In practice, temporary fasteners may be applied along the mounting bracket 705 or flange 707 to fasten and temporarily secure the air-cooling accessory device 300 to a portion of the oil access door 103 or engine air cooling inlets 105 while in use. Some of these temporary fasteners may include, for example, quick release latches, quick release pins, threaded screws, snap on buttons, clips, straps, and hook and loop fasteners.

FIG. 12A-FIG. 12D illustrate a top view (FIG. 12A), a bottom view (FIG. 12B), a side view (FIG. 12C), and a side perspective view (FIG. 12D) of the grille 711 and the housing 301, in accordance to an embodiment. The grille 711 may include a base plate 713 and plurality of blades (or louvers) 715 both made from heat resistant and light-weight materials such as aluminum and other composite metals. The plurality of blades 715 plurality of blades 715 may be configured as either the vertical or horizontal blades and individually adjustable. Metal fasteners such as screws, clips, or similar mounting components may be used to secure the grille 711 to the bottom of the housing 301. In operation, the grill 711 may provide a 2-way direction airflow pattern, allowing the ambient airflow 304 to be concentrated to a particular area in the engine compartment of the piston engine aircraft 100 where cooling is most likely needed. In other embodiments, the grill 711 may be circular in design delivering a uniform 360° horizontal air pattern.

FIG. 13A-FIG. 13E illustrate a top view (FIG. 13A), a side view (FIG. 13B), a bottom view (FIG. 13C), and side perspective views (FIG. 13D and FIG. 13E) of the airflow port adapter 715, in accordance to an embodiment. In one implementation, the airflow port adapter 715 may include a coupling member 1301 for mating with a bottom portion of the housing 301, and adapting member 1303 for mating to a corresponding shaped port of the piston engine aircraft 100. For example, for oil door 103 and engine air cooling inlets 105 openings may have rectangular or circular shaped ports into which the adapting member 1303 may have a rectangular or circular shape, respectively, to be inserted. In other implementations, the adapting member 1303 may include other irregular shapes generally matching shape of the oil door 103 and engine air cooling inlets 105 openings of the piston engine aircraft 100. In practice, when the airflow port adapter 715 is attached to the housing 301, the ambient airflow 304 from the bottom portion of the housing 301 is transmitted and channeled through the airflow port adapter 715 to an adapter opening 1305, providing cool air to the engine of the piston engine aircraft 100 through the oil door 103 or engine air cooling inlets 105.

Figure 14:
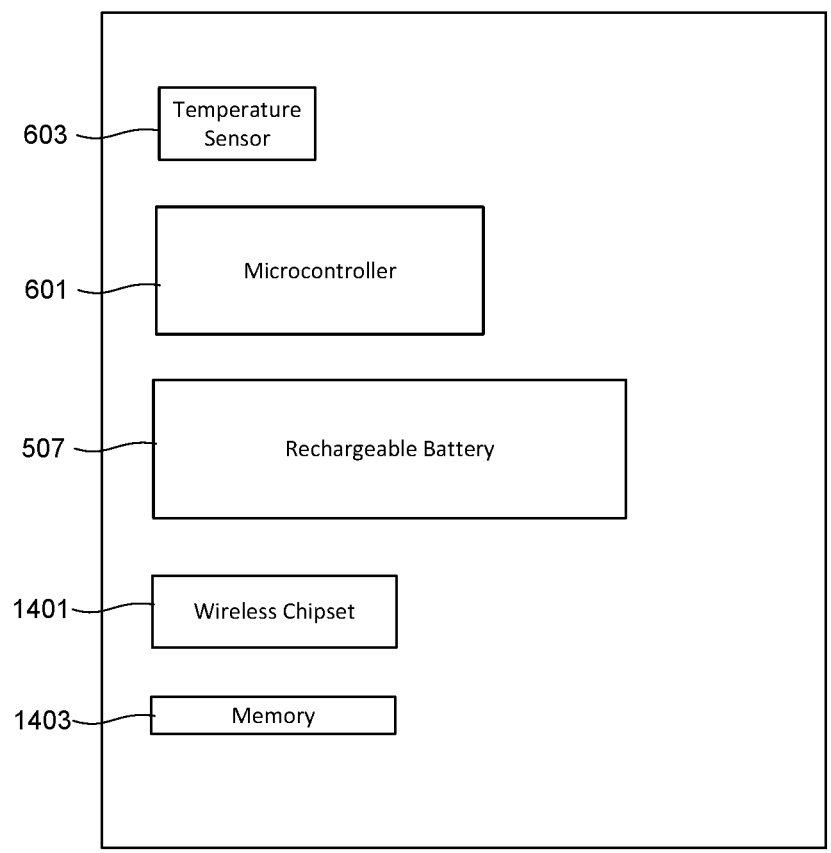
FIG. 14 illustrates a top view of a schematic diagram of the printed circuit board (PCB) including some electrical components used to control, monitor, and drive the accessory device, in accordance to an embodiment.

FIG. 14 illustrates a top view of a schematic diagram of the printed circuit board (PCB) 600 including some electrical components used to control, monitor, and drive the accessory device 300 in accordance to an embodiment. These components may include the microcontroller 601, the onboard temperature sensor 603, and the rechargeable battery 507 as previously described. The electrical components may also include a wireless chipset 1401 for allowing the accessory device 300 to connect to another wireless-enabled device to control the accessory device 300 remotely. In addition, the electrical components may include storage memory 1403 for logging and storing temperature readings and storing software programs that operate the accessory device 300.

Figure 15B:
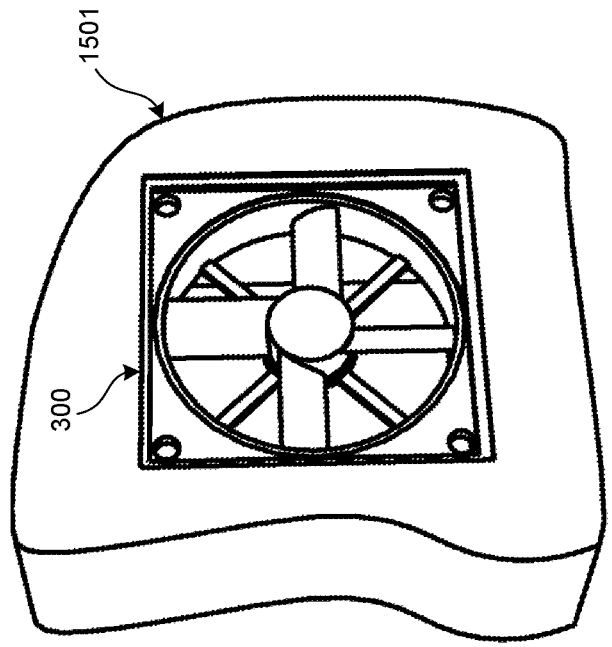
FIG. 15A and FIG. 15B illustrate a top and perspective view, respectively, of the portable and removable air-cooling accessory integrated into the center of a compressible cowl plug, in accordance to an embodiment.
Figure 15A:
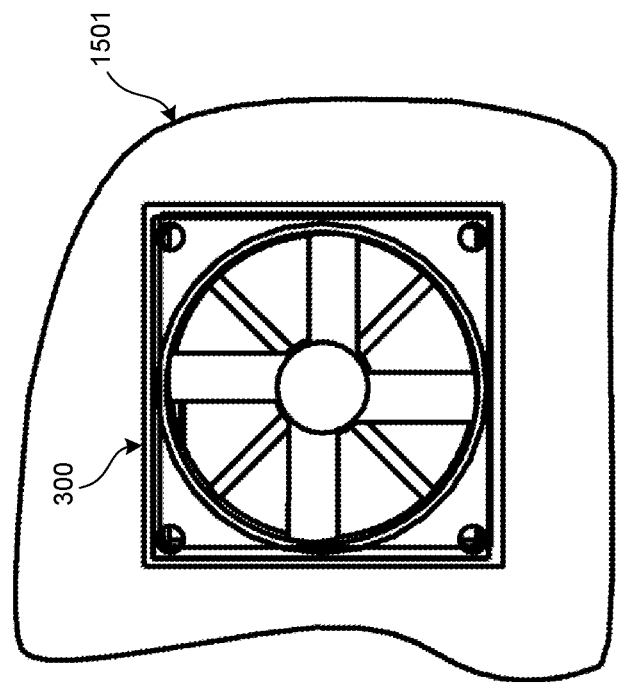

FIG. 15A and FIG. 15B illustrate a top and perspective view, respectively, of the portable and removable air-cooling accessory 300 integrated into the center of a compressible cowl plug 1501, in accordance to an embodiment. In this embodiment, the compressible cowl plug 1501 includes an opening or cavity for receiving the portable and removable air-cooling accessory 300. The compressible cowl plug 1501 may include fasteners to secure the portable and removable air-cooling accessory 300 to an interior portion of the compressible cowl plug 1501.

Figure 16:
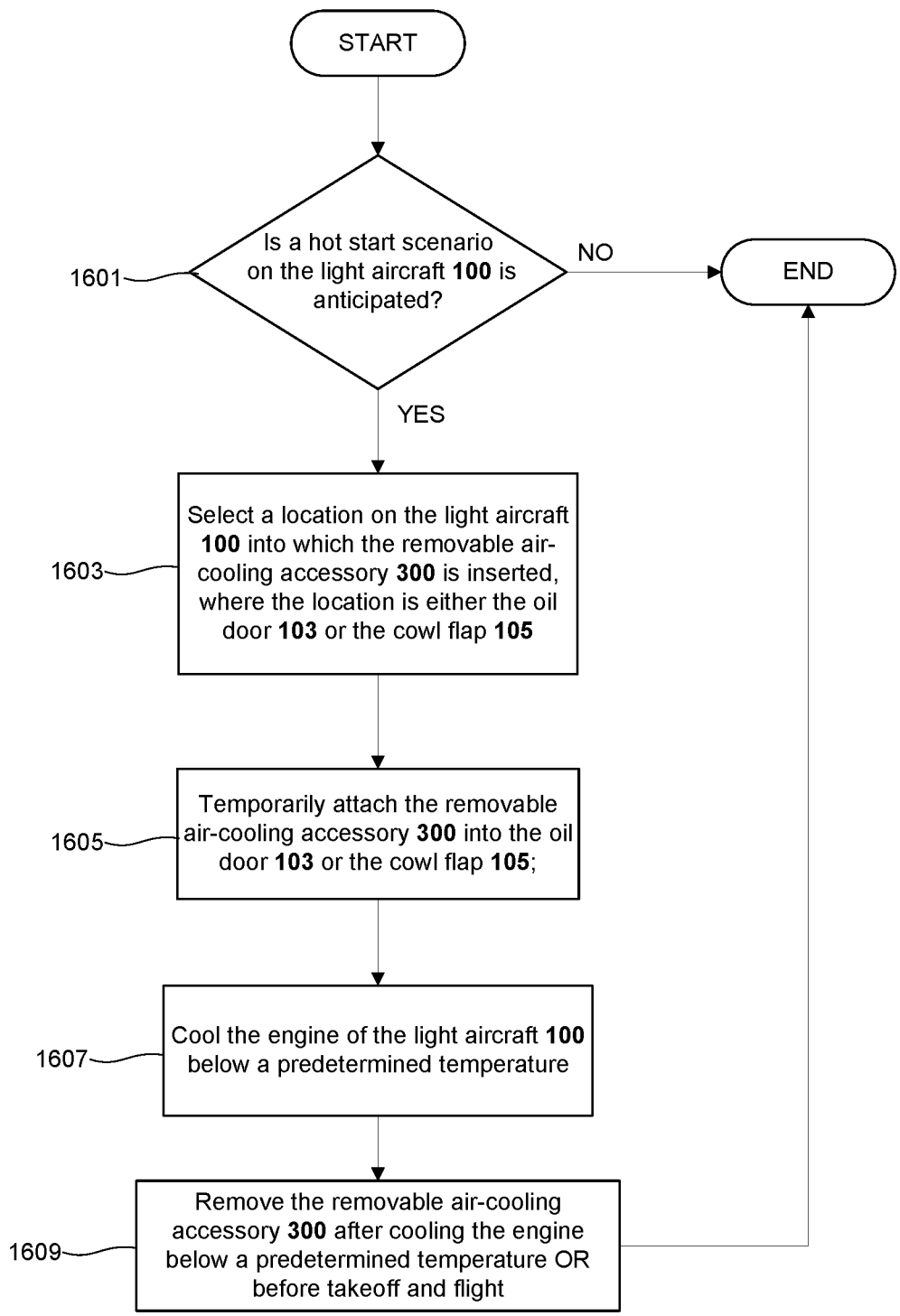
FIG. 16 illustrates a method for cooling the engine of the piston engine aircraft using the portable and removable air-cooling accessory, in accordance to an embodiment.

FIG. 16 illustrates a method for cooling the engine of the piston engine aircraft 100 using the portable and removable air-cooling accessory 300, in accordance to an embodiment. For example, these steps may include 1) Determining if a hot start scenario on the piston engine aircraft 100 is anticipated (e.g., shortly after landing the piston engine aircraft 100) (1601); 2) Selecting a location on the piston engine aircraft 100 into which the removable air-cooling accessory 300 is inserted, where the location is either the oil door 103 or the engine air cooling inlets 105 (1603); 3) temporarily attaching the removable air-cooling accessory 300 into the oil door 103 or the engine air cooling inlets 105 (1605); 4) cooling the engine of the piston engine aircraft 100 below a predetermined temperature (1607); and 5) removing the removable air-cooling accessory 300 after cooling the engine below a predetermined temperature or before takeoff and flight (1609).

Figure 17C:
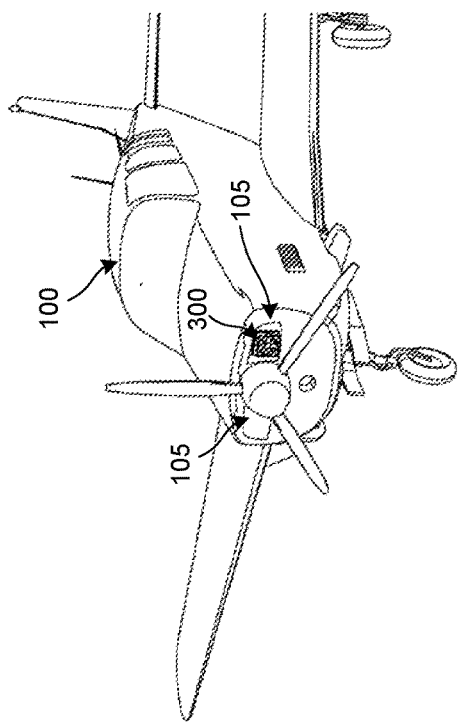
FIG. 17A-FIG. 17D illustrate the portable and removable air-cooling accessory temporarily mounted on various locations on the piston engine aircraft, in accordance to an embodiment.
Figure 17D:
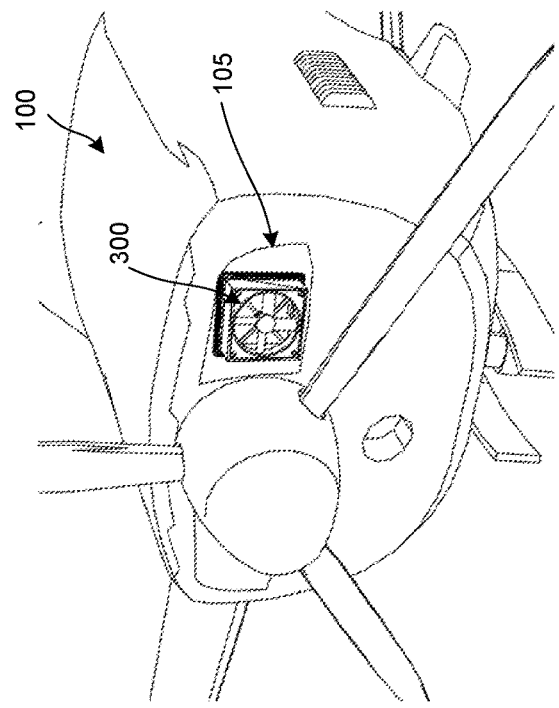
Figure 17A:
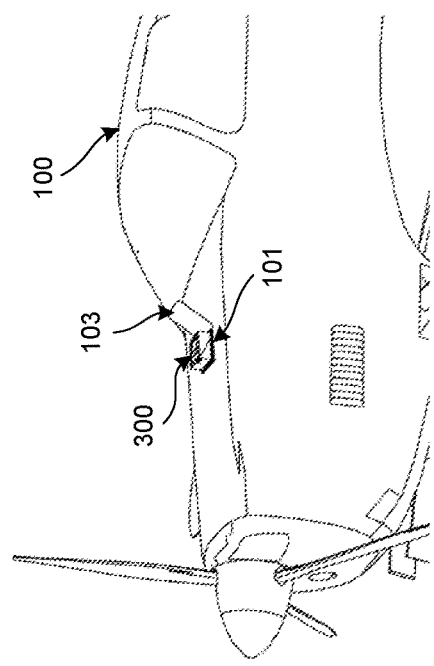
Figure 17B:
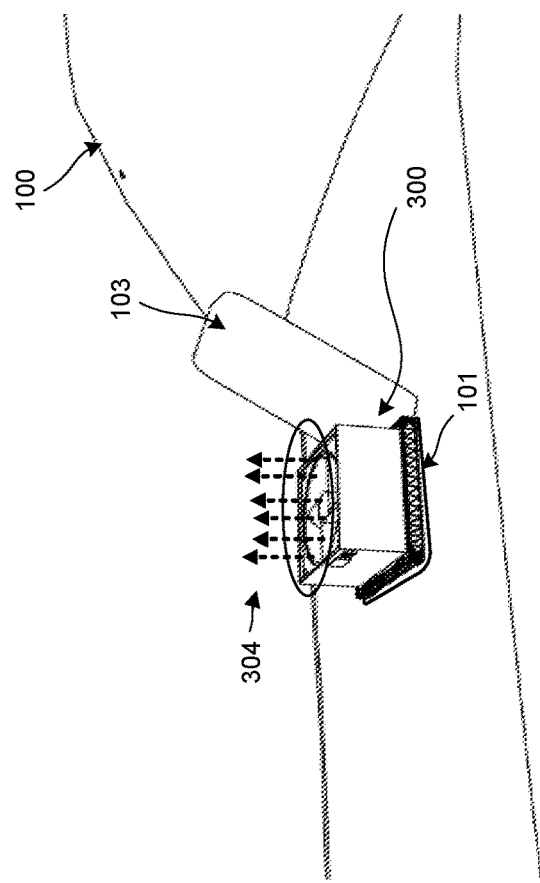

FIG. 17A-FIG. 17D illustrate the portable and removable air-cooling accessory 300 temporarily placed on various locations on the piston engine aircraft 100, in accordance to an embodiment. In one placement configuration, with the oil door 103 in the open position, the air-cooling accessory 300 may sit on top of the engine/oil compartment access 101 as shown in FIG. 17A and FIG. 17B. In another placement configuration, the air-cooling accessory 300 sits inside one of the engine air cooling inlets 105. Application and use of the portable and removable air-cooling accessory 300 on piston engine aircrafts is only intended for non-flight scenarios and is not meant to have the structural design integrity and aerodynamics to support flight and wind resistance.

Advantages of the portable and removable air-cooling accessory 300 include providing a low cost and aftermarket piston engine aircraft accessory for pilots who wish to avoid the time delay that can occur with hot starts which will significantly increase cooling efficiency; facilitating the rapid movement of ambient air through the engine compartment to rapidly and efficiently cool the engine in a short period of time; and minimize vapor lock issues associated with hot start scenarios.

Other embodiments of the air-cooling accessory 300 may include different fan assembly 303 configurations including modifying the size of fan or use of multiple fans to increase airflow port. In another configuration, a separate cooling mechanism (e.g., chiller) may be coupled to fan to reduce the ambient air temperature (if too high).

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. A portable and removable air-cooling accessory device for conveying an ambient airflow to cool an engine of a piston engine aircraft through an engine input port and one or more engine air cooling inlets, the portable and removable air-cooling accessory device comprising:
    a housing for receiving and channeling the ambient airflow;
    a motorized fan assembly coupled to a top portion of the housing, wherein the housing includes a hollow enclosure and two ports, wherein the two ports include an air exhaust port formed at the top portion of the housing and an airflow port opening formed at a bottom portion of the housing, wherein the motorized fan assembly when enabled is configured to force the ambient airflow upward through the engine input port, thereby pulling the ambient air through the one or more engine air cooling inlets, over the engine, resulting in cooling the engine;
    a power switch coupled to the motorized fan assembly and the housing; and
    a rechargeable battery coupled to the motorized fan assembly, the power switch and the housing, wherein the rechargeable battery provides power to drive the motorized fan assembly when activated by the power switch.

2. The portable and removable air-cooling accessory device of claim 1, wherein the engine input port includes an oil compartment access or an engine air cooling port.

3. The portable and removable air-cooling accessory device of claim 1 further comprising an LED indicator attached to the housing.

4. The portable and removable air-cooling accessory device of claim 1 further comprising a USB power port coupled to the rechargeable battery for delivering an external power to charge the rechargeable battery.

5. The portable and removable air-cooling accessory device of claim 1, wherein the housing and the motorized fan assembly are fabricated from a heat resistant material to withstand extreme heat that is evacuated from the engine input port of the piston engine aircraft.

6. The portable and removable air-cooling accessory device of claim 1 further comprising a printed circuit board including a microcontroller for controlling the motorized fan assembly and an onboard temperature sensor for monitoring and reading a temperature reading of the ambient airflow and converting the temperature reading into an electrical signal for the microcontroller to process and generate an appropriate response to control the motorized fan assembly.

7. The portable and removable air-cooling accessory device of claim 6, wherein the printed circuit board includes a wireless chipset for allowing another wireless-enabled device to wirelessly control the portable and removable air-cooling accessory device.

8. The portable and removable air-cooling accessory device of claim 1, wherein the hollow enclosure has a cylindrical and cone-like shaped body.

9. The portable and removable air-cooling accessory device of claim 1, wherein the hollow enclosure has a tapered shaped box.

10. The portable and removable air-cooling accessory device of claim 1 further comprising a filter screen coupled to the motorized fan assembly.

11. The portable and removable air-cooling accessory device of claim 1 further comprising an airflow handler coupled to an interior portion of the housing.

12. The portable and removable air-cooling accessory device of claim 1 further comprising a support and mounting bracket coupled to an exterior portion of the housing.

13. The portable and removable air-cooling accessory device of claim 1 further comprising a flange coupled near the bottom portion of the housing, wherein the flange is configured to provide a support area for the housing to sit on the engine input port of the piston engine aircraft.

14. The portable and removable air-cooling accessory device of claim 1 further comprising a gasket coupled to the flange for providing an air tight sealing between the housing and the engine input port of the piston engine aircraft.

15. The portable and removable air-cooling accessory device of claim 1 further comprising a grille coupled to the housing, wherein the grille includes a plurality of adjustable louvers to redirect the ambient airflow.

16. The portable and removable air-cooling accessory device of claim 1 further comprising an airflow port adapter for coupling the bottom portion of the housing to fit a variety of different shapes of the engine input port.

17. The portable and removable air-cooling accessory device of claim 1, wherein the portable and removable air-cooling accessory device is disconnected and removed from the piston engine aircraft when in flight or not in use.

18. The portable and removable air-cooling accessory device of claim 1, wherein one or more temporary fasteners are coupled to the housing to temporarily secure the housing to the piston engine aircraft.

19. The portable and removable air-cooling accessory device of claim 18, wherein the one or more temporary fasteners include quick release latches, quick release pins, threaded screws, snap on buttons, clips, straps, or hook and loop fasteners.

* * * * *